United States Patent
Kuroda

(10) Patent No.: US 11,900,301 B2
(45) Date of Patent: Feb. 13, 2024

(54) INFORMATION PROCESSING DEVICE AND INFORMATION PROCESSING METHOD

(71) Applicant: Information System Engineering Inc., Tokyo (JP)

(72) Inventor: Satoshi Kuroda, Tokyo (JP)

(73) Assignee: INFORMATION SYSTEM ENGINEERING INC., Tokyo (JP)

( * ) Notice: Subject to any disclaimer, the term of this patent is extended or adjusted under 35 U.S.C. 154(b) by 331 days.

(21) Appl. No.: 17/610,215

(22) PCT Filed: Apr. 30, 2021

(86) PCT No.: PCT/JP2021/017204
§ 371 (c)(1),
(2) Date: Nov. 10, 2021

(87) PCT Pub. No.: WO2021/225118
PCT Pub. Date: Nov. 11, 2021

(65) Prior Publication Data
US 2022/0245558 A1    Aug. 4, 2022

(30) Foreign Application Priority Data

May 7, 2020   (JP) ................ 2020-082018

(51) Int. Cl.
*G06Q 10/0639*   (2023.01)
*G06T 7/10*   (2017.01)
*G06V 20/52*   (2022.01)

(52) U.S. Cl.
CPC ......... *G06Q 10/06398* (2013.01); *G06T 7/10* (2017.01); *G06V 20/52* (2022.01)

(58) Field of Classification Search
CPC .... G06Q 10/06398; G06Q 30/02; G06T 7/10; G06T 2207/20084; G06T 2207/20081;
(Continued)

(56) References Cited

U.S. PATENT DOCUMENTS 11,205,086 B2 * 12/2021 Sriram ................... G06V 20/52
11,295,165 B1 *  4/2022 Agarwal ............ G06F 18/2413
(Continued)

FOREIGN PATENT DOCUMENTS

| JP | 2018-97580 | 6/2018 |
| JP | 2019-109844 | 7/2019 |
| JP | 6651190 | 2/2020 |

OTHER PUBLICATIONS

International Search Report dated Jul. 13, 2021 in International (PCT) Application No. PCT/JP2021/017204.

*Primary Examiner* — Michael S Osinski
(74) *Attorney, Agent, or Firm* — Wenderoth, Lind & Ponack, L.L.P.

(57) ABSTRACT

An information processing device is configured to output work information related to work performed by a serving person, the information processing device including an image acquisition unit configured to acquire an original image including a served person and a plurality of served objects that the serving person serves, an image division unit configured to divide the original image into a served-person image, in which the served person is captured, and a plurality of served-object images, in which each served object is captured, a scene estimation unit configured to estimate a scene, which is the situation the serving person is in, by using a first trained model, a chunk estimation unit configured to estimate a chunk, which is information dividing or suggesting the work information, by using one of a plurality of second trained models, and an output unit configured to output the chunk.

5 Claims, 10 Drawing Sheets

(58) Field of Classification Search
CPC .......... G06T 7/11; G06V 20/52; G06V 10/82; G06V 10/764; G06V 10/40; G06V 10/25; G06V 10/454; G09B 5/02; G09B 9/00; G09B 19/00; G06F 16/2282; G06F 16/2455; G06F 16/285; G06N 3/045; G06N 3/08; G06N 20/00; G06N 3/084; G06N 5/04; G06N 3/044; G06N 3/0464; G06N 20/10; G06N 3/088

See application file for complete search history.

(56) References Cited

U.S. PATENT DOCUMENTS

| | | | | |
|---|---|---|---|---|
| 11,341,714 B2* | 5/2022 | Kuroda | | G06T 19/006 |
| 11,393,253 B1* | 7/2022 | Maron | | G06V 10/25 |
| 11,429,893 B1* | 8/2022 | Tong | | G06N 20/00 |
| 11,531,571 B2* | 12/2022 | Stanley | | G06Q 30/0603 |
| 11,531,846 B1* | 12/2022 | Bodapati | | G06N 20/00 |
| 11,593,704 B1* | 2/2023 | Jenatton | | G06F 16/958 |
| 11,645,860 B2* | 5/2023 | Cetintas | | G06F 16/58 706/20 |
| 11,651,023 B2* | 5/2023 | Kuroda | | G06F 16/51 707/741 |
| 11,682,065 B2* | 6/2023 | Hu | | G06V 20/52 705/15 |
| 11,734,937 B1* | 8/2023 | Pushkin | | G06V 30/10 706/12 |
| 11,741,168 B1* | 8/2023 | Bodapati | | G06F 16/35 706/12 |
| 11,804,014 B1* | 10/2023 | Casaburo | | G06T 19/006 |
| 2015/0025913 A1* | 1/2015 | Friedlander | | G16H 10/60 705/3 |
| 2019/0138973 A1* | 5/2019 | Akella | | G06F 16/2365 |
| 2020/0065573 A1 | 2/2020 | Asl | | |
| 2020/0265363 A1* | 8/2020 | Yadhunandan | .. | G06Q 10/06395 |
| 2021/0027098 A1* | 1/2021 | Ge | | G06F 18/217 |
| 2021/0034657 A1* | 2/2021 | Kale | | G06V 20/35 |
| 2021/0042530 A1* | 2/2021 | Kim | | G06F 18/214 |
| 2021/0158959 A1* | 5/2021 | Kuroda | | G16H 40/20 |
| 2021/0191971 A1* | 6/2021 | Ko | | G06F 16/535 |
| 2021/0224609 A1* | 7/2021 | Yang | | G06N 3/045 |
| 2021/0264210 A1* | 8/2021 | Ueta | | G06F 18/2148 |
| 2021/0271912 A1* | 9/2021 | Wu | | G06N 3/08 |
| 2021/0383166 A1* | 12/2021 | Nie | | G06F 18/2137 |
| 2022/0051055 A1* | 2/2022 | Sakuma | | G06F 18/25 |
| 2022/0053195 A1* | 2/2022 | Hurwitz | | G06F 16/583 |
| 2022/0067455 A1* | 3/2022 | Nabi | | G06F 18/217 |
| 2022/0092331 A1* | 3/2022 | Stoppa | | G06F 18/21 |
| 2022/0122360 A1* | 4/2022 | Singh | | G06T 5/00 |
| 2022/0147771 A1* | 5/2022 | Bae | | G06V 10/764 |
| 2022/0148191 A1* | 5/2022 | Liu | | G06T 7/174 |
| 2022/0180622 A1* | 6/2022 | Zhang | | G06V 10/776 |
| 2022/0189209 A1* | 6/2022 | Song | | G06V 10/761 |
| 2022/0198671 A1* | 6/2022 | Price | | G06N 3/08 |
| 2022/0207397 A1* | 6/2022 | Chen | | G06V 10/776 |
| 2022/0309280 A1* | 9/2022 | Singhal | | G06F 16/7834 |
| 2022/0318553 A1* | 10/2022 | Ben Yahia | | G06V 10/87 |
| 2022/0327711 A1* | 10/2022 | Wang | | G06T 7/143 |
| 2022/0415023 A1* | 12/2022 | Han | | G06V 10/761 |
| 2023/0087292 A1* | 3/2023 | Wang | | G06N 3/0464 382/159 |
| 2023/0153619 A1* | 5/2023 | Ye | | G06N 3/096 706/15 |
| 2023/0176911 A1* | 6/2023 | Griffin | | G06V 20/52 718/104 |
| 2023/0290276 A1* | 9/2023 | Buras | | G09B 5/065 |
| 2023/0360437 A1* | 11/2023 | Shin | | G06V 40/176 |
| 2023/0385379 A1* | 11/2023 | Wrenninge | | G06F 18/214 |

* cited by examiner

FIG. 6

SCENE TB (TB1)

| SCENE ID | SCENE NAME |
|---|---|
| OFD | GRADE INQUIRY |
| OFE | CAREER COUNSELING |
| ... | |

MODEL TB (TB2)

| MODEL ID | SCENE ID |
|---|---|
| MD1 | OFD |
| MD2 | OFE |
| ... | |

CONTENT TB (TB3)

| CONTENT ID | CONTENTS |
|---|---|
| 1B827-01 | 1B827-01.txt |
| 1B828-02 | 1B828-02.mov |
| 1B829-05 | 1B829-02_1.pdf |
| ... | |

SCENE/CONTENT TB (TB4)

| SCENE ID | CONTENT ID |
|---|---|
| OFD | 1B827-01 |
| OFD | 1B828-02 |
| OFD | 1B829-05 |
| OFD | ... |
| OFE | 1B840-01 |
| OFE | 1B845-01 |
| OFE | 1B850-03 |
| OFE | ... |
| ... | |

CONTENT/CHUNK TB (TB5)

| CONTENT ID | CHUNK ID |
|---|---|
| 1B827-01 | 82700-01 |
| 1B828-02 | 82800-02 |
| 1B829-05 | 82901-01 |
| 1B829-05 | 82902-01 |
| 1B829-05 | 82903-05 |
| | ... |

CHUNK/META TB (TB6)

| CHUNK ID | CHUNK-META ID |
|---|---|
| 82700-01 | 24FD |
| 82700-01 | 83D9 |
| 82800-02 | 25FD |
| 82800-02 | 84D9 |
| 82901-01 | 54BB |
| 82901-01 | 25FD |
| | ... |

CHUNK TB (TB7)

| CHUNK ID | CHUNK | CHUNK SUMMARY | HASH VALUE |
|---|---|---|---|
| 82700-01 | 1B827-01.txt_0 | ...TO PUBLIC EMPLOYMENT SECURITY OFFICE | 564544d8f0b746e |
| 82800-02 | 1B828-02.mov_0 | [MOVIE] 3:08 | 4d8f0b746e56454 |
| 1B829-05 | 1B829-02_1.pdf_1 | STEP 1: FOR MOVE ... | ef984e9e1e20e16 |
| ... | | | |

CHUNK-META TB (TB8)

| CHUNK-META ID | CHUNK-CATEGORY ID | CHUNK-CATEGORY NAME | CHUNK-META VALUE |
|---|---|---|---|
| 24FD | 394 | SIZE | A4 |
| 25FD | 394 | SIZE | B4 |
| 83D9 | 025 | COLOR | WHITE |
| 84D9 | 025 | COLOR | BLUE |
| 53BB | 120 | SHAPE | HOLE IN SIDE |
| 54BB | 120 | SHAPE | NO HOLE |
| ... | | | |

RECOMMENDATION TB (TB9)

| MODEL ID | CHUNK-META ID | RECOMMENDED SERVED-OBJECT IMAGE |
|---|---|---|
| MD1 | (24FD,83D9), (25FD) | IMG001.jpg |
| MD2 | (25FD), (25FD) | IMG002.jpg |
| MD2 | (83D9), (25FD) | IMG003.jpg |
| ... | | |

INFORMATION PROCESSING DEVICE AND INFORMATION PROCESSING METHOD

TECHNICAL FIELD

The present invention relates to an information processing device and an information processing method.

BACKGROUND ART

For example, the work support system of patent literature 1 generates rules that describe the condition for judging the target of work or the situation of work, based on a manual that describes the work procedures, details, points to be noted, and/or other matters, identifies the target of work and the situation of work based on sensor information acquired from the equipment attached to the user, and outputs work support information based on the rules generated and the results of identification by the identifying means.

CITATION LIST

Patent Literature

Patent Literature 1: Japanese Unexamined Patent Application Publication No. 2019-109844

SUMMARY OF INVENTION

Problem to be Solved by the Invention

However, with the technique described in patent literature 1, the information accumulated in the form of documents such as manuals can be searched only on a per document basis. For example, when searching documents for paragraphs, it is necessary to reconstruct documents into structured information. Considering the cost effectiveness, reconstructing all the documents to be searched is more likely to be not realistic. Furthermore, when information is provided only in document units, a lot of unnecessary information has to be viewed, and there is a problem that the viewer is unable to handle these documents in a speedy fashion.

It is therefore an object of one aspect of an embodiment of the present invention to provide an information processing device that presents information to the user as needed by the user, in the amount needed by the user, without reconstructing information on a large scale.

Means for Solving the Problems

An information processing device to output work information, which is information related to the work a serving person performs, has an image acquisition unit to acquire an original image, which is an image including a served person that the serving person serves, and a plurality of served objects that the serving person serves, an image division unit to divide the original image into a served-person image, in which the served person is captured, and a plurality of served-object images, in which each served object is captured, a scene estimation unit to estimate a scene, which is a situation the serving person is in, by using a first trained model, in which an association between the served-person image and a scene ID to uniquely indicate the scene is stored, a chunk estimation unit to estimate a chunk, which is information dividing or suggesting the work information, by using one of a plurality of second trained models, in which an association between the plurality of served-object images and one or a plurality of chunk meta IDs, associated on a one-to-one basis with a chunk ID to uniquely indicate the chunk is stored, and an output unit to output the chunk, the chunk estimation unit selects one of the plurality of second trained models by using a model ID associated with a scene ID on a one-to-one basis, and the chunk metal IDs uniquely indicate meta values, which are information related to a nature of the served objects.

An information processing method that an information processing device to output work information performs, which is information related to work performed by a serving person, and the information processing method includes a first step of acquiring an original image, which is an image including a served person that the serving person serves, and a plurality of served objects that the serving person serves, a second step of dividing the original image into a served-person image, in which the served person is captured, and a plurality of served-object images, in which each served object is captured, a third step of estimating a scene, which is a situation the serving person is in, by using a first trained model, in which an association between the served-person image and a scene ID to uniquely indicate the scene is stored, a fourth step of estimating a chunk, which is information dividing or suggesting the work information, by using one of a plurality of second trained models, in which an association between the plurality of served-object images and one or a plurality of chunk meta IDs, associated on a one-to-one basis with a chunk ID to uniquely indicate the chunk is stored, and a fifth step outputting the chunk, one of the plurality of second trained models is selected by using a model ID associated with a scene ID on a one-to-one basis, and the chunk metal IDs uniquely indicate meta values, which are information related to a nature of the served objects.

Advantageous Effects of Invention

According to one aspect of an embodiment of the present invention, it is possible to realize an information processing device that presents information to the user, as needed by the user, in the amount needed by the user, without reconstructing information on a large scale.

BRIEF DESCRIPTION OF DRAWINGS

FIG. 6 is a diagram to show information that is stored in the auxiliary storage device according to the present embodiment;

DESCRIPTION OF EMBODIMENTS

Hereinafter, one aspect of an embodiment of the present invention will be described in detail below, with reference to the accompanying drawings. For example, the information which the worker responsible for the maintenance of equipment in medical and nursing care environments will be described below. For example, assuming the front desk at a university, the counter at a pharmacy, and so forth, information about served objects that a "serving person" (for example, a worker who serves a served person) consults when serving a "served person" (for example, a student, a student's guardian, a patient, etc.) will be described. A served object may be document at a university front desk, or may be a drug at a pharmacy counter.

(Present Embodiment)

Figure 1:
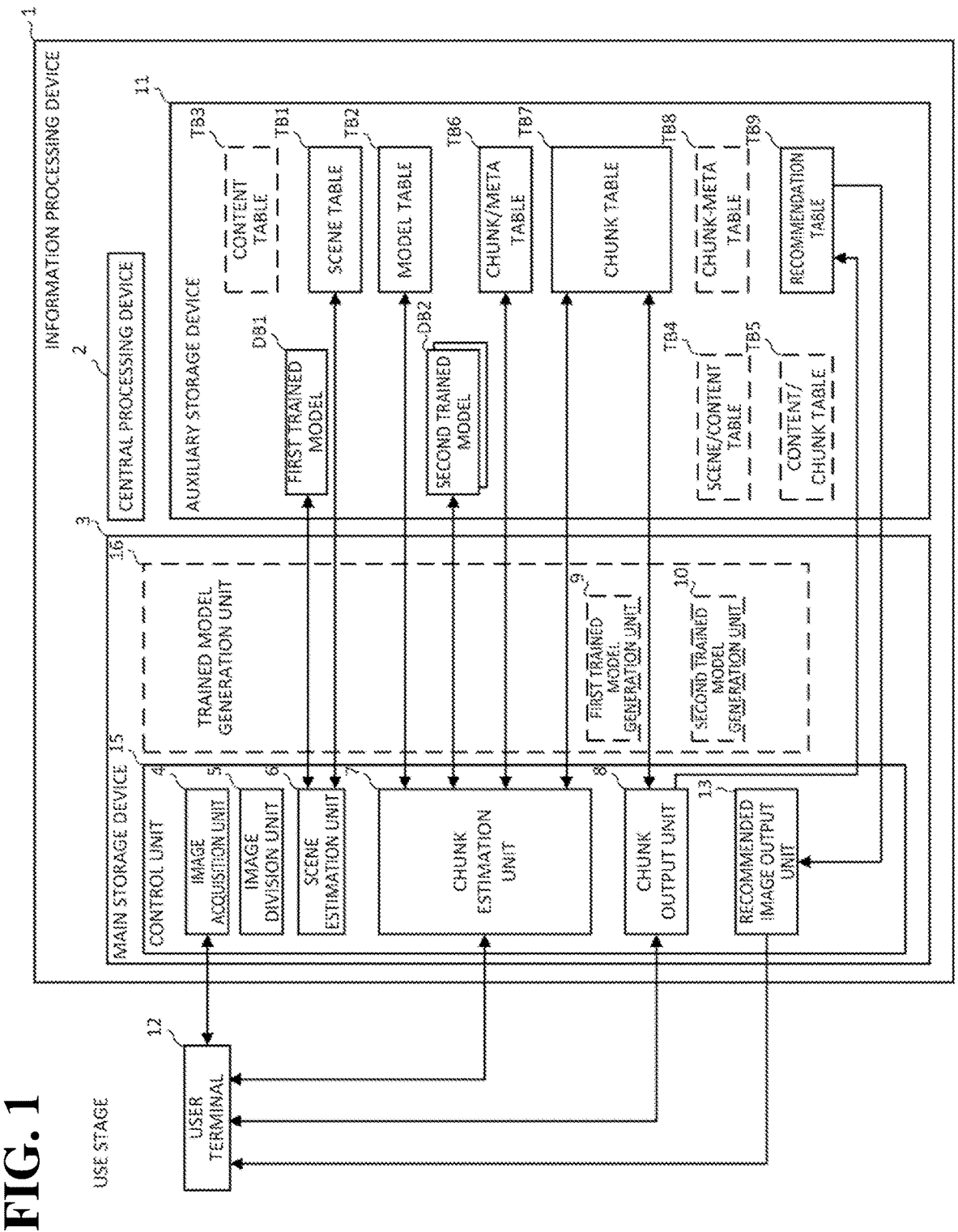
FIG. 1 is a block diagram to show a configuration of the information processing device in the use stage according to the present embodiment.

First, an information processing device 1 in the use stage will be described with reference to FIG. 1. FIG. 1 is a block diagram to show a configuration of the information processing device 1 in the use stage according to the present embodiment. The information processing device 1 has a central processing device 2, a main storage device 3, and an auxiliary storage device 11.

The central processing device 2 is, for example, a CPU (Central Processing Unit), and executes processes by invoking programs stored in the main storage device 3. The main storage device 3 is, for example, a RAM (Random Access Memory), and stores, as will be described later, programs such as an image acquisition unit 4, an image division unit 5, a scene estimation unit 6, a chunk estimation unit 7, a chunk output unit 8, a first trained model generation unit 9, a second trained model generation unit 10, and a recommended image output unit 13.

Note that the program covering the image acquisition unit 4, the division unit 5, the scene estimation unit 6, the chunk estimation unit 7, the chunk output unit 8 and the recommended image output unit 13 may be referred to as a "control unit 15". The program covering the first trained model generation unit 9 and the second trained model generation unit 10 may be referred to as a "trained model generation unit 16".

The auxiliary storage device 11 is, for example, an SSD (Solid State Drive) or an HDD (Hard Disk Drive), and stores, as will be described later, databases such as a first trained model DB 1, a first training model DB 1', a second trained model DB 2, and a second training model DB 2', and tables such as a scene table TB 1, a model table TB 2, a content table TB 3, a scene/content table TB 4, a content/chunk table TB 5, a chunk/meta table TB 6, a chunk table TB 7, and a chunk-meta table TB 8.

As shown in FIG. 1, the information processing device 1 that outputs work information, which is information related to the work the serving person performs, has, in the use stage, an image acquisition unit 4, an image division unit 5, a scene estimation unit 6, a chunk estimation unit 7, a chunk output unit 8 that outputs chunks, which are information that divide or suggest work information. Here, work information may be referred to as "contents", and content IDs are provided to identify work information uniquely.

The image acquisition unit 4 acquires an original image 20 (FIG. 3), which is an image to include a served person 21 (FIG. 3) that a serving person serves, and a plurality of served objects 22 to 25 (FIG. 3) that the serving person serves, from a user terminal 12, such as a personal computer with a camera. The image division unit 5 divides the original image 20 into a served-person image 30, in which the served person 21 is captured, and a plurality of served-object images 40 to 43, in which the served objects 22 to 25 are captured.

The scene estimation unit 6 estimates the scene, which is the situation the serving person is in. To be more specific, the scene estimation unit 6 acquires a served-person image 30 (35), and estimates the scene by using a first trained model DB 1, in which the associations between the served-person image 30 (35) and scene IDs, which indicate scenes uniquely, are stored.

Using the scene ID as a search key, the scene estimation unit 6 acquires a scene name from a scene table TB 1, which is a table in which scene IDs and scene names, which are the names of scenes, are linked on a one-to-one basis, and transmits this to the user terminal 12. The user terminal 12 presents the scene name received from the scene estimation unit 6, to the user.

The chunk estimation unit 7 acquires served-object images 40 to 43, which are images of served objects 22 (23 to 25) that relate to the work, and estimates a chunk by using one of a plurality of second trained model DBs 2, in which the associations between the served-object images 40 (41 to 43) and one or a plurality of chunk meta IDs, which are linked on a one-to-one basis with chunk IDs that indicate chunks uniquely, are stored.

The chunk estimation unit 7 selects one of the plurality of second trained model DBs 2, by using the model ID that is linked with the scene IDs on a one-to-one basis. Also, the chunk meta IDs indicate chunk meta values, which are information related to the natures of the served objects 22 to 25.

Using the scene ID as a search key, the chunk estimation unit 7 acquires a model ID, from the model table TB 2, which is a table in which model IDs and scene IDs are linked on a one-to-one basis. Furthermore, using the chunk-meta ID as a search key, the chunk estimation unit 7 acquires a chunk ID from the chunk/meta table TB 6, which is a table in which chunk IDs and chunk-meta IDs are linked on a one-to-one or one-to-many basis.

Furthermore, using the chunk ID as a search key, the chunk estimation unit 7 acquires a chunk summary, which shows a summary of the chunk, from a chunk table TB 7, and transmits the chunk summary to the user terminal 12. The user terminal 12 presents the chunk summary, received from the chunk estimation unit 7, to the user.

Furthermore, using the chunk ID as a search key, the chunk estimation unit 7 acquires the chunk from the chunk table TB 7, and transmits the chunk to the user terminal 12. The user terminal 12 presents the chunk, received from the chunk estimation unit 7, to the user.

Note that the chunk table TB 7 is a table, in which chunks, chunk summaries, and hash values are linked with chunk IDs on a one-to-one basis. Note also that the hash values are used, for example, to check whether or not the chunks have been changed.

The information processing device 1 may further have a recommended image output unit 13, and the auxiliary storage device 11 may further have a recommendation table TB 9. Using the combination of a model ID and one or a plurality of chunk meta IDs as a search key, the recommended image output unit 13 searches for a recommended served-object image, using the recommendation table TB 9.

The recommended image output unit 13 outputs a recommended served-object image that has been searched out, to the user terminal 12. A recommended served-object image refers to an image of a served object that is not captured in the original image 20, but is likely to be basically necessary. Note that the recommendation table TB 9 is a table, in which the combinations of model IDs and chunk meta IDs are linked with recommended served-object images on a one-to-one basis.

Next, the information processing device 1 in the training stage will be described with reference to FIG. 2. For example, in the training stage, a served-person image 30 (35) and one or a plurality of served-object images 40 to 43 are input from an input device (not shown), and learned as a set. Here, "learning" refers to, for example, supervised learning.

Figure 2:
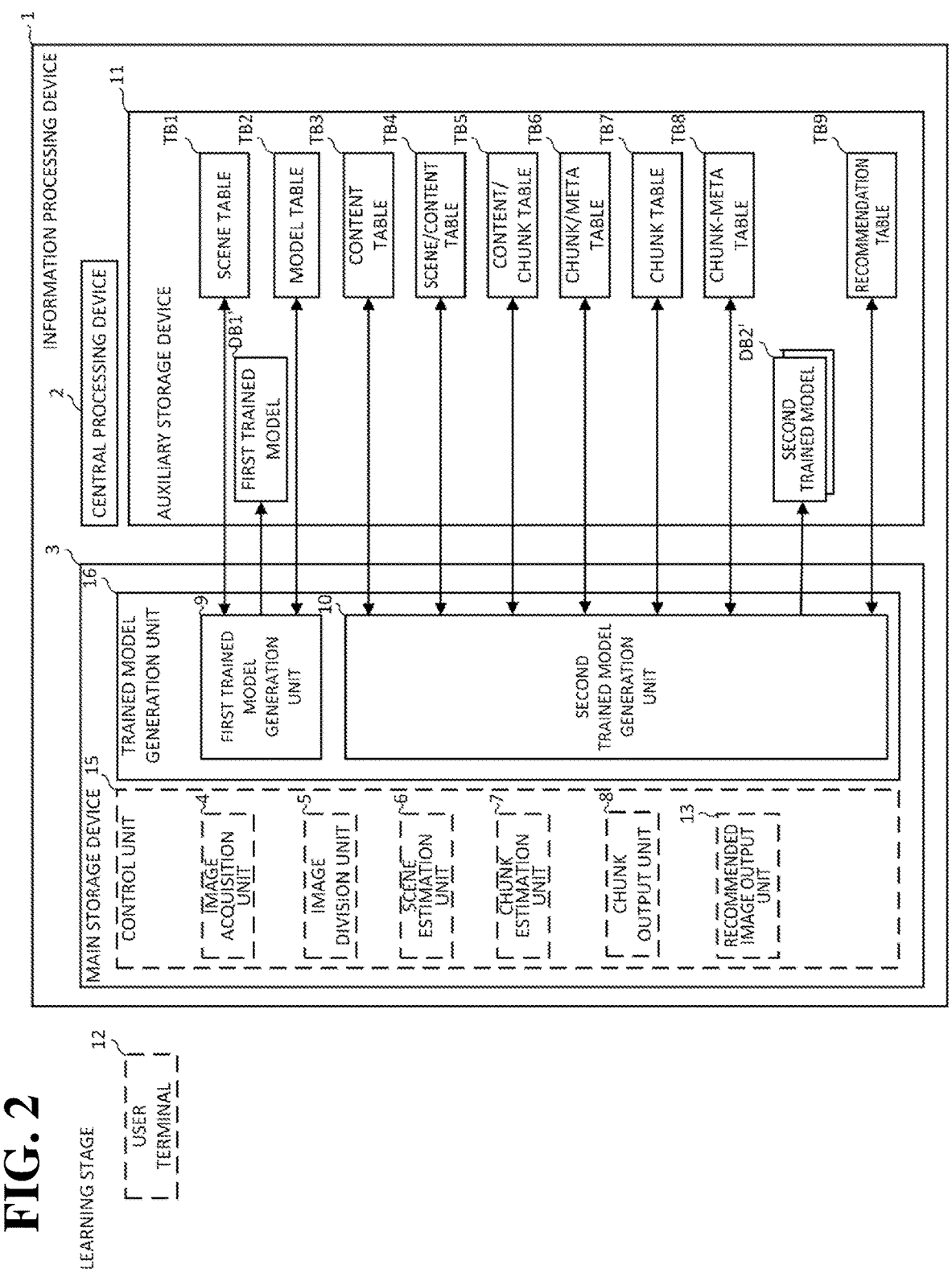
FIG. 2 is a block diagram to show a configuration of the information processing device in the training stage according to the present embodiment.

FIG. 2 is a block diagram to show a configuration of the information processing device 1 in the training stage according to the present embodiment. In the training stage, the information processing device 1 has a first trained model generation unit 9 and a second trained model generation unit 10.

The first trained model generation unit 9 is a program for generating a first trained model DB 1 by learning a set of a scene ID and a served-person image 30(35) as a set, in the first training model DB 1'.

The first trained model generation unit 9 acquires the scene ID from the scene table TB 1 for the served-person image 30 (35), and acquires the model ID that corresponds to the scene ID, from the model table TB 2.

The second trained model generation unit 10 is a program for generating a second trained model DB 2 by specifying a model ID and having one or a plurality of chunk meta IDs and a served-object image 40 (41 to 43) learned in the second training model DB 2' as a set.

Using the scene ID as a search key, the second trained model generation unit 10 acquires a content ID from a scene/content table TB 4, which is a table in which scene IDs and content IDs are linked on a one-to-many basis. Note that the scene ID used as a search key here is linked with the served-object image 30 (35) that is paired with the served-object image 40 (41 to 43) to be processed.

Using the content ID as a search key, the second trained model generation unit 10 acquires contents from the content table TB 3, which is a table in which content IDs and contents are linked on a one-to-one basis.

Using the content ID as a search key, the second trained model generation unit 10 acquires a chunk ID from the content/chunk table TB 5, which is a table in which content IDs and chunk IDs are linked on a one-to-one or a one-to-many basis.

The second trained model generation unit 10 acquires the chunk from the chunk table TB 7 by using the chunk ID as a search key, and acquires a chunk-meta ID from the chunk/meta table TB 6 by using the chunk ID as a search key.

Using the chunk-meta ID as a search key, the second trained model generation unit 10 acquires a chunk-meta value from the chunk-meta table TB 8. The chunk-meta table TB 8 is a table, in which chunk-category IDs, chunk-category names and chunk-meta values are linked with chunk-meta IDs on a one-to-one basis.

The chunk-category IDs uniquely identify chunk-category names, which are the names of categories where the chunk-meta values belong. Note that the second trained model generation unit 10 consults the served-object image 40 (41 to 43), and checks whether there is no problem with the acquired chunk, contents, and chunk-meta value.

Values that are problematic are judged as being abnormal values and not used in supervised learning, so that the second trained model generation unit 10 can generate highly accurate trained model DBs 2, and, in the use stage, the information processing device 1 can perform highly accurate processing.

Figure 3:
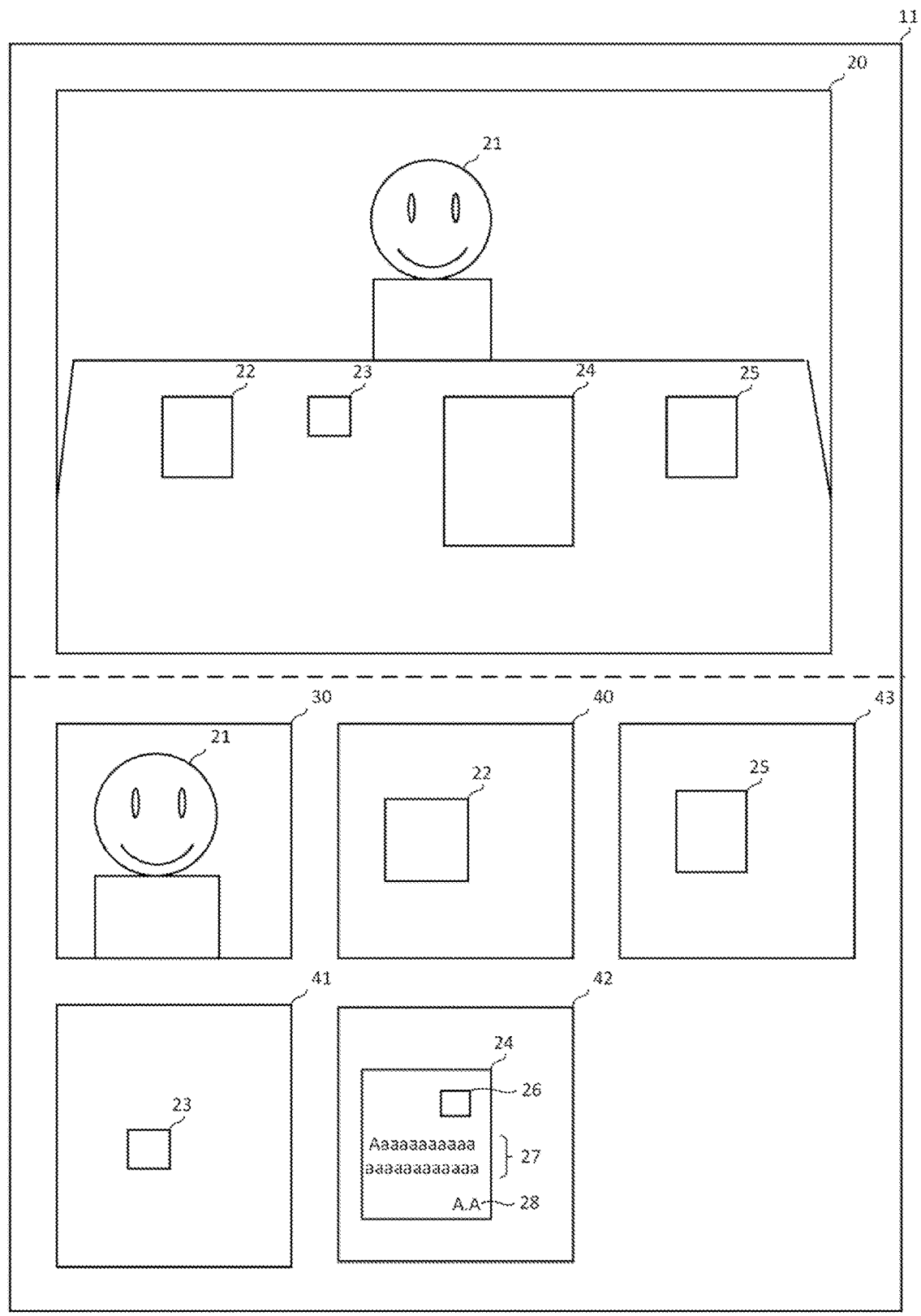
FIG. 3 is a diagram to show an original image, a serving person and a plurality of served objects according to the present embodiment.

Next, the original image 20, which the user terminal 12 acquires, and which the information processing device 1 processes as information, and the served-person image 30 and the served-object images 40 to 43, which are generated by dividing the original image 20, will be described with reference to FIG. 3. FIG. 3 is a diagram to show the original image 20, the served-person image 30 and a plurality of served-object images 40 to 43 according to the present embodiment.

The original image 20, the served-person image 30 and the plurality of served-object images 40 to 43 are, for example, displayed on the user terminal 12. Although FIG. 3 shows an example in which these images are displayed all at the same time, the original image 20, the served-person image 30 and the plurality of served-object images 40 to 43 may as well be displayed separately on the user terminal 12.

In the original image 20, the served person 21 and the served objects 22 to 25 are captured. As for the served objects 22 to 25, for example, the size and/or the like are estimated based on information that does not vary per scene in the booth, such as a desk. Also, like the served object 24, for the served objects 22 to 25, content information such as an attachment picture 26, text 27 or a signature 28 inside, and so forth may be acquired.

Figure 4:
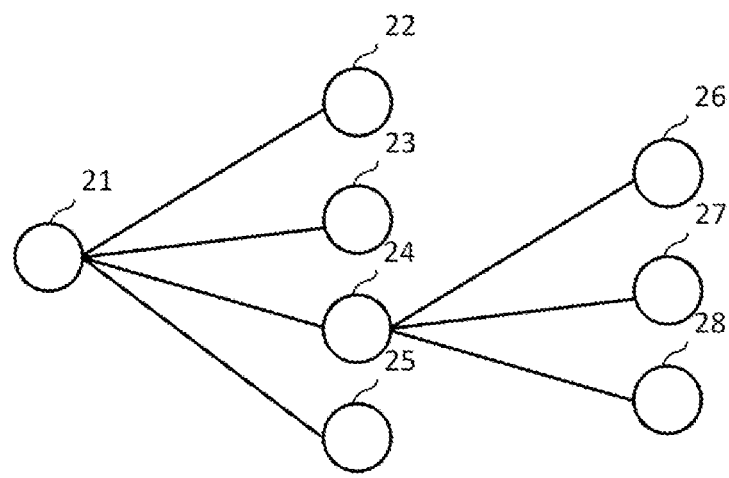
FIG. 4 is a diagram to show a tree structure, which shows the relationship between a serving person and a plurality of served objects according to the present embodiment.

Next, the relationship between the served person 21 and the plurality of served objects 22 to 25 will be described with reference to FIG. 4. FIG. 4 is a diagram to show a tree structure, which shows the relationship between the served person 21 and the plurality of served objects 22 to 25 according to the present embodiment.

As shown in FIG. 4, the image division unit 5 associates between the served person 21 and the plurality of served objects 22 to 25, by making the served person 21 the root node and the served objects 22 to 25 leaf nodes or internal nodes.

Also, the image division unit 5 may acquire information such as the attachment picture 26, the text 27 and the signature 28, which are information included in at least one of the served objects 22 to 25, and associate these information with the tree structure as leaf nodes.

Figure 5:
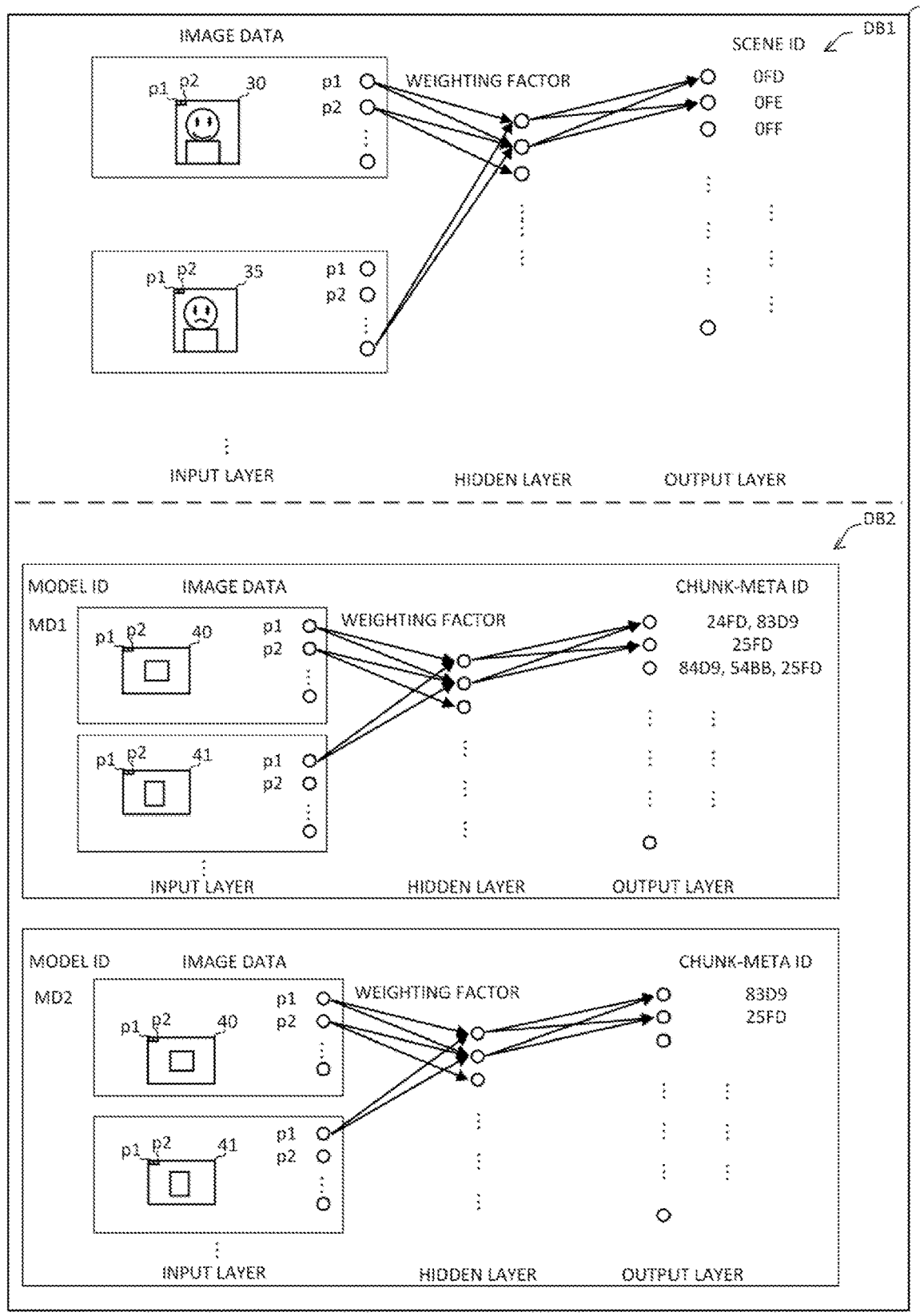
FIG. 5 is a diagram to show the first trained model and the second trained model according to the present embodiment.

Next, the first trained model DB 1 and the second trained model DB 2 will be described with reference to FIG. 5. FIG. 5 shows the first trained model DB 1 and the second trained model DB 2 according to the present embodiment.

In the first trained model DB 1, the associations between a plurality of served-person images 30 (35) and a plurality of scene IDs are stored, which are generated on machine learning using a plurality of sets of image data and scene IDs as training data. Here, machine learning is, for example, a convolutional neural network (CNN).

The associations between served-person images 30 (35) and scene IDs, to be more specific, can be represented by a convolutional neural network, which is comprised of the nodes represented by circles in FIG. 5, the edges represented by arrows, and the weighting factors configured for the edges. Note that, as shown in FIG. 5, the served-person images 30 (35) are input in the first trained model DB 1, for example, per pixel such as pixel p1, pixel p2, and so forth.

There are a plurality of second trained model DBs 2, linked with the model IDs on a one-to-one basis. Each second trained model DB 2 stores the associations between a plurality of served-object images 40 (41 to 43) and one or a plurality of chunk-meta IDs are stored, which are generated based on machine learning using a plurality of sets of training data, each set being comprised of a served-object image 40 (41 to 43) and one or a plurality of chunk-meta IDs. Here, machine learning is, for example, a convolutional neural network (CNN).

The associations between the plurality of served-object images 40 (41 to 43) and one or a plurality of chunk-meta IDs can be represented, to be more specific, by a convolutional neural network, which is comprised of the nodes represented by circles in FIG. 5, the edges represented by arrows, and the weighting factors configured for the edges. Note that, as shown in FIG. 5, the served-object images 40 (41 to 43) are input in the second trained model DB 2, for example, per pixel such as pixel p1, pixel p2, and so forth.

Next, the information stored in the auxiliary storage device 11, namely the scene table TB 1, the model table TB 2, the content table TB 3, the scene/content table TB 4, the content/chunk table TB 5, the chunk/meta table TB 6, the chunk table TB 7, the chunk-meta table TB 8 and the recommendation table TB 9 will be described with reference to FIG. 6. FIG. 6 is a diagram to show the information stored in the auxiliary storage device 11 according to the present embodiment.

The scene IDs stored in the scene table TB 1 and/or elsewhere are each represented by, for example, a three-digit hexadecimal number, like "0FD". Also, the scene names stored in the scene table TB 1 and/or elsewhere are, for example, "grade inquiry", "career counselling" and so forth.

The model IDs stored in the model table TB 2 and/or elsewhere are each represented by, for example, two letters of the alphabet and a one-digit decimal number, like "MD 1". The content IDs stored in the content table TB 3 and/or elsewhere are each represented by, for example, a five-digit hexadecimal number and a two-digit decimal number, like "1B827-01". The contents stored in the content table TB 3 and/or elsewhere are each shown with an extension, where the file name is the content ID, like "1B827-01.txt", and a pointer to the body of the contents is stored.

The chunk IDs stored in the content/chunk table TB 5 and/or elsewhere are each represented by, for example, five-digit and two-digit decimal numbers, like "82700-01". The chunk-meta IDs stored in the chunk/meta table TB 6 and/or elsewhere are each represented by, for example, a four-digit hexadecimal number, like "24FD".

The chunks stored in the chunk table TB 7 are each represented by, for example, the file name of the contents corresponding to the chunk in question, and a one-digit decimal number, like "1B827-01.txt_0", and a pointer to a part of the body of the contents corresponding to the chunk in question is stored.

The chunk summaries stored in the chunk table TB 7 are each a document summarizing the contents of a chunk, such as, for example, " . . . to the public employment security office . . . ". The hash values stored in the chunk table TB 7 are each represented by, for example, a fifteen-digit hexadecimal number, like "564544d8f0b746e".

The chunk-category IDs stored in the chunk-meta table TB 8 are each represented by, for example, a three-digit decimal number, like "394". The chunk-category names stored in the chunk-meta table TB 8 each indicate, for example, the size of the paper, the color of the paper, and whether there are holes on the paper, and so forth. The chunk-meta values stored in the chunk-meta table TB 8 each indicate, for example, A4, B4, white, blue, holes on the side, no holes, and so forth. Note that the values of chunk-category IDs and chunk-category names may be NULL.

The combinations of chunk meta IDs stored in the recommendation table TB 9 are, for example, (24FD, 83D9), (25FD) and so forth, and one or a plurality of chunk meta IDs are combined. As for the recommended served-object images stored in the recommendation table TB 9, for example, pointers to the body, the file name of which is indicated with an extension like "IMG001.jpg", are stored.

As shown by the scene/content table TB 4, the content/chunk table TB 5 and the chunk/meta table TB 6, the data structure of work information has a hierarchical structure, in which the chunk-meta ID is the first layer, which is the lowest layer, the chunk ID is the second layer, the content ID is the third layer, and the scene ID is the fourth layer, which is the highest layer.

Figure 7:
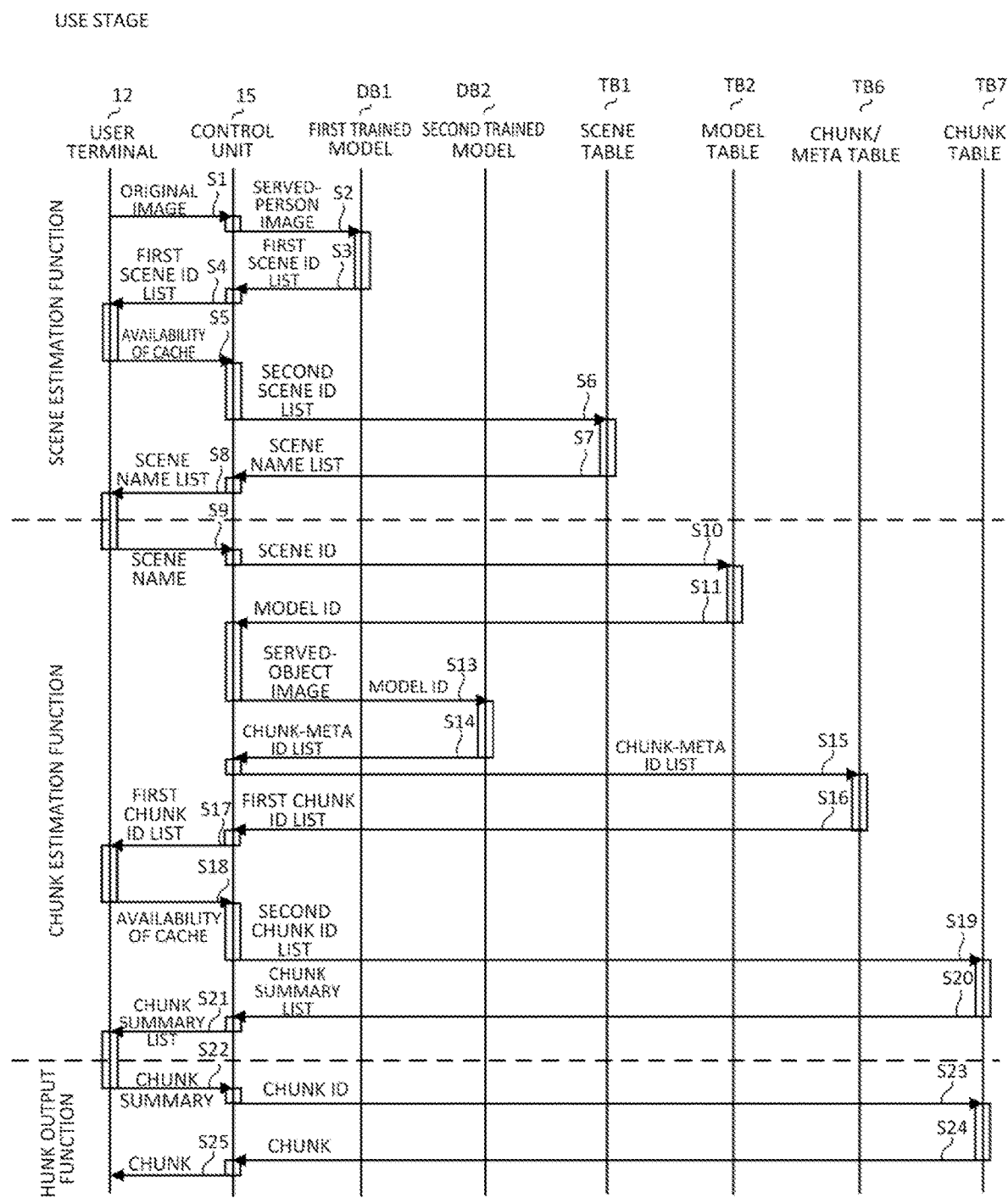
FIG. 7 is a sequence diagram for use for describing the scene estimation function, the chunk estimation function and the chunk output function according to the present embodiment.

Next, the scene estimation function, the chunk estimation function, and the chunk output function will be described with reference to FIG. 7. FIG. 7 is a sequence diagram for use for describing the scene estimation function, the chunk estimation function, and the chunk output function according to the present embodiment.

The information processing functions in the use stage are comprised of a scene estimation function, realized by the scene estimation process S60 (described later), a chunk estimation function, realized by the chunk estimation process S80 (described later), and a chunk output function, realized by the chunk output process S100 (described later).

First, the scene estimation function will be described. The image acquisition unit 4 included in the control unit 15 receives an original image 20 from a user terminal 12 (S1). Next, the image division unit 5 included in the control unit 15 divides the original image 20 into a served-person image 30 and served-object images 40 to 43.

The image division unit 5 transmits the served-person image 30 to the scene estimation unit 6, and transmits the served-object images 40 to 43 to the chunk estimation unit 7. Next, the scene estimation unit 6 included in the control unit 15 inputs the served-person image 30 to the first trained model DB 1 (S2).

The first trained model DB 1 selects one or a plurality of scene IDs that are strongly linked with the received served-person image 30, and outputs the one or plurality of scene IDs (hereinafter these may be referred to as the "first scene ID list") selected, to the scene estimation unit 6 (S3).

When the scene estimation unit 6 acquires the first scene ID list, the scene estimation unit 6 transmits it to the user terminal 12 on an as-is basis (S4). The user terminal 12 transmits the availability of a cache, to the scene estimation unit 6, for each scene ID included in the first scene ID list (S5).

For the information processed in the past, the user terminal 12 holds a table that is equivalent to the scene table TB 1. Using the scene IDs in the received first scene ID list as search keys, the user terminal 12, searches the table held in the user terminal 12. The scene IDs, for which search results are found, are cached, and the scene IDs, for which no search results are found, are not cached.

Using one or a plurality of scene IDs that are not cached in the user terminal 12 (and that hereinafter may be referred to as a "second scene ID list") as search keys, among the scene IDs included in the first scene ID list received from the user terminal 12, the scene estimation unit 6 searches the table TB 1 (S6).

The scene estimation unit 6 acquires the scene names that correspond respectively to the scene IDs included in the second scene ID list (and that hereinafter may be referred to as a "scene name list"), as a result of the search, from the scene table TB 1 (S7).

The scene estimation unit 4 transmits the acquired scene name list to the user terminal 12, on an as-is basis (S8). In the use stage, the information processing device 1 realizes the scene estimation function for estimating the scene of the served-person image 30, by estimating the scene name, in steps S1 to S8.

Next, the chunk estimation function will be described. The user terminal 12 presents the received scene name list to the user. The user selects, for example, one scene name from the scene name list presented. The user terminal 12 transmits the scene name selected by the user, to the chunk estimation unit 7 included in the control unit 15 (S9).

Using the scene ID corresponding to the scene name received from the user terminal 12 as a search key (S10), the chunk estimation unit 7 searches the model table TB 2, and acquires a model ID (S11).

The chunk estimation unit 7 receives the served-object image 40 (41 to 43) from the image division unit 5 (S12). The chunk estimation unit 7 designates one of the plurality of second trained model DBs 2 based on the model ID acquired from the model table TB 2, and inputs the served-object image 40 (41 to 43) to the designated second trained model DB 2 (S13).

The second trained model DB 2 selects one or a plurality of chunk-meta IDs that are strongly linked with the received served-object image 40 (41 to 43), and outputs the one or plurality of chunk-meta IDs that are selected (and that hereinafter may be referred to as a "chunk-meta ID list"), to the chunk estimation unit 7 (S14).

Using each one or a plurality of chunk-meta IDs included in the chunk-meta ID list as search keys, the chunk estimation unit 7 searches the chunk/meta table TB 6 (S15).

The chunk estimation unit 7 acquires one or a plurality of chunk IDs (which hereinafter may be referred to as the "first chunk ID list"), as a result of the search, from the chunk/meta table TB 6 (S16). The chunk estimation unit 7 transmits the acquired first chunk ID list, to the user terminal 12, on an as-is basis (S17).

The user terminal 12 transmits the availability of a cache, to the chunk estimation unit 7, for each chunk ID included in the first chunk ID list (S18). For the information processed in the past, the user terminal 12 has a table with the chunk ID column and the chunk summary column of the chunk table TB 7.

Using the chunk IDs in the received first chunk ID list as search keys, the user terminal 12 searches the table held in the user terminal 12. The chunk IDs for which search results are found are cached, and the chunk IDs for which no search results are found are not cached.

Using one or a plurality of chunk IDs that are not cached in the user terminal 12, among the chunk IDs included in the first chunk ID list received from the user terminal 12 (and that hereinafter may be referred to as a "second chunk ID list") as search keys, the chunk estimation unit 7 searches the table TB 7 (S19).

The chunk estimation unit 7 acquires the chunk summaries that correspond respectively to the chunk IDs included in the second chunk ID list (and that hereinafter may be referred to as a "chunk summary list"), as a result of the search, from the chunk table TB 7 (S20). The chunk estimation unit 7 transmits the acquired chunk summary list to the user terminal 12 on an as-is basis (S21).

In the use stage, the information processing device 1 realizes the chunk estimation function of estimating the chunk of the served object 22 (23 to 25) by estimating a chunk summary, in steps S9 to S21.

Next, the chunk output function will be described. The user terminal 12 presents the received chunk summary list to the user. The user selects, for example, one chunk summary out of the chunk summary list presented. The user terminal 12 transmits the chunk summary selected by the user, to the chunk output unit 8 included in the control unit 15 (S22).

Using the chunk ID corresponding to the chunk summary received from the user terminal 12 as a search key (S23), the chunk output unit 8 searches the chunk table TB 7, and acquires a chunk (S24).

The chunk output unit 8 transmits the acquired chunk to the user terminal 12 on an as-is basis (S25). The user terminal 12 presents the received chunk to the user. In the use stage, the information processing device 1 realizes the chunk output function for outputting the chunk of the served-object image 22 (23 to 25), in steps S22 to S25.

Next, the first trained model generation function and the second trained model generation function will be described with reference to FIG. 8. FIG. 7 is a sequence diagram for use for describing the first trained model generation function and the second trained model generation function according to the present embodiment.

The information processing function of the training stage is comprised of the first trained model generation function, which is realized by the first trained model generation process, and the second trained model generation function, which is realized by the second trained model generation process.

First, the first trained model generation function will be described. A first trained model generation unit 9, included in the trained model generation unit 16, designates the processing-target set of a scene name, a served-person image 30 and one or a plurality of served-object images 40 to 43, and, using the scene name as a search key, searches the scene table TB 1 that is generated in advance (S31).

The first trained model generation unit 9 acquires a scene ID from the scene table TB 1 as a result of the search (S32), and has the served-person image 30 and the scene ID learned in the first training model DB 1' as a set (S33).

Furthermore, the first trained model generation unit 9 requests the acquisition of a model ID, by transmitting the acquired scene ID to the model table TB 2 (S34). The model table TB 2 generates a model ID corresponding to the received scene ID, and stores the combination of the scene ID and the model ID.

Next, the first trained model generation unit 9 acquires the model ID from the model table TB 2 (S35). In the training stage, the information processing device 1 realizes the first trained model generation function of generating the first trained model DB 1 in steps S31 to S35.

Next, the second trained model generation function will be described. Using the scene ID received in the first trained model generation unit 9 in step S32, as a search key, a second trained model generation unit 10, included in the trained model generation unit 16, searches the scene/content table TB 4 generated in advance (S36).

The second trained model generation unit 10 acquires a content ID from the scene/content table TB 4 as a result of the search (S37), and, using the acquired content ID as a search key, searches the content table TB 3 that is generated in advance (S38).

The second trained model generation unit 10 acquires contents from the content table TB 3 as a result of the search (S39), and, using the content ID acquired in step S37 as a search key, searches the content/chunk table TB 5 that is generated in advance (S40).

The second trained model generation unit 20 acquires a chunk ID from the content/chunk table TB 5, as a result of the search (S41), and, using the acquired chunk ID as a search key, searches the chunk table TB 7 that is generated in advance. (S42).

The second trained model generation unit 10 acquires the chunk from the chunk table TB 7 as a result of the search (S43), and, using the chunk ID acquired in step S41 as a search key, searches the chunk/meta table TB 6 that is generated in advance (S44).

The second trained model generation unit 10 acquires one or a plurality of chunk-meta IDs from the chunk/meta table TB 6, as a result of the search (S45), and, using each chunk-meta ID that is acquired, as a search key, searches the chunk-meta table TB 8 that is generated in advance (S46).

The second trained model generation unit 10 acquires chunk-meta values, each corresponding to a chunk-meta ID, from the chunk-meta table TB 8, as a result of the search (S47).

The second trained model generation unit 10 checks whether there are no problems with the contents acquired in step S39, the chunk acquired in step S43, and the chunk-meta value acquired in step S47, with reference to the served-person image 30 and the served-object images 40 to 43.

For example, the second trained model generation unit 10 checks this by looking at the expression on the face of the served person 21, the file names shown in the served objects 22 to 24, and so forth. The second trained model generation unit 10, for example, judges the expression on the face of the served person 21 from the served-person image 30, and judges the file names shown in the served objects 22 to 25, from the served-object images 40 to 43.

If, with reference to these, there is a problem—for example, it is clear that the contents, chunk, and meta-values represent information related to documents that are clearly different from the documents captured in the served-object images 40 to 43—the processing for the target set ends.

Next, the second trained model generation unit 10 has a model ID, a served-object image 40 (41 to 43) one or a plurality of chunk-meta IDs learned in the second training model DB 2' as a set (S48). In the training stage, the information processing device 1 realizes the second trained model generation function for generating the second trained model DB 2, in steps S36 to S48.

Figure 9:
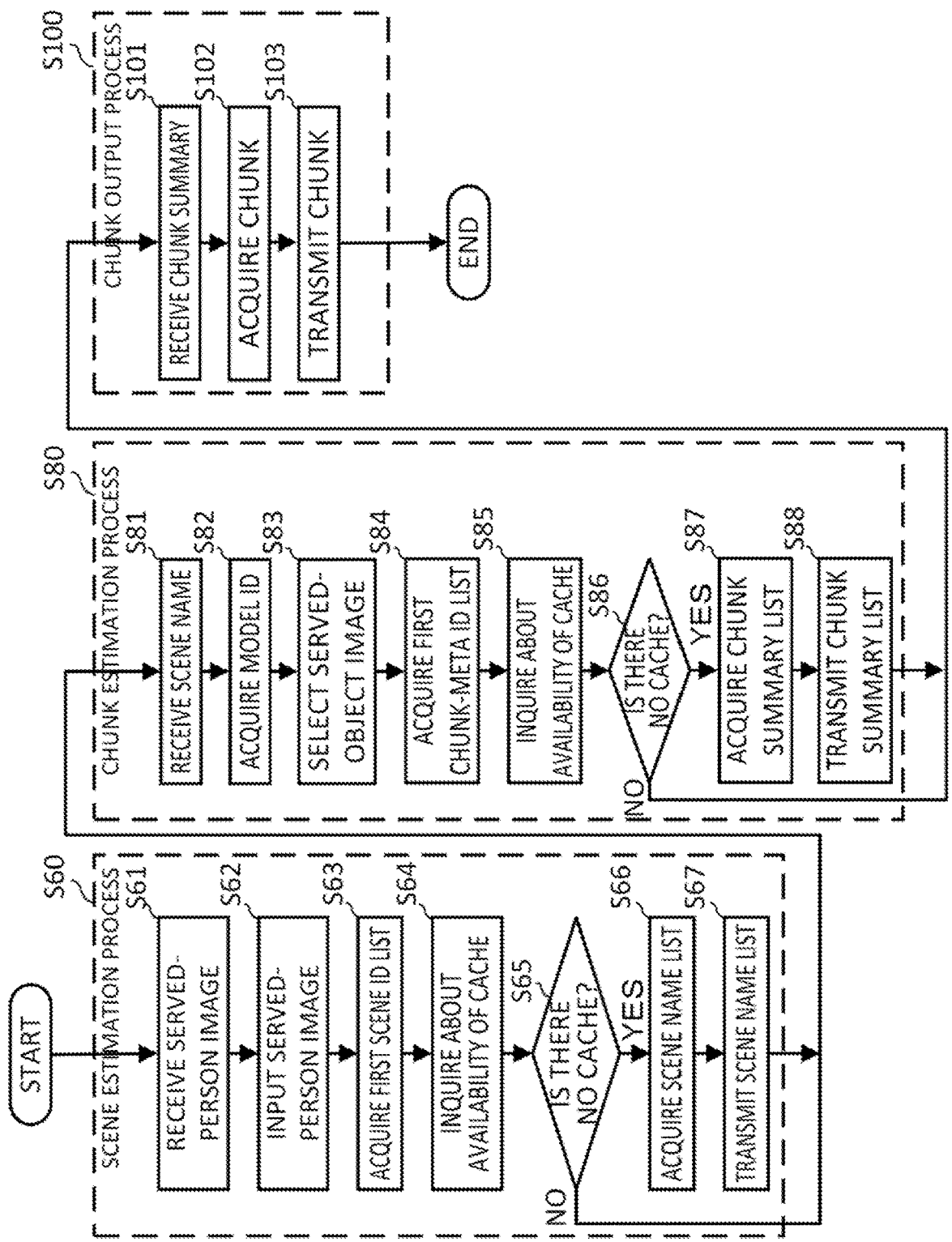
FIG. 9 is a block diagram to show the processing procedures of information processing in the use stage according to the present embodiment.

Next, the information processing in the use stage will be described with reference to FIG. 9. FIG. 9 is a flowchart to show the processing procedures of information processing in the use stage according to the present embodiment. The information processing in the use stage is comprised of a scene estimation process S60, a chunk estimation process S80, and a chunk output process S100.

First, the scene estimation process S60 will be described. The scene estimation process S60 is comprised of steps S61 to S67. When the scene estimation unit 4 receives a served-person image 30 (35) from the image division unit 5 (S61), the scene estimation unit 4 inputs the served-person image 30 (35) to the trained model DB 1 (S62).

The scene estimation unit 6 acquires the first scene ID list as an output from the first trained model DB 1 (S63), transmits the first scene ID list to the user terminal 12 on an as-is basis, and inquires with the user terminal 12 about the availability of cache (S64).

When all results returned from the user terminal indicate "there is a cache" (S65: NO), the scene estimation process S60 ends, and thereupon the chunk estimation process S80 is started. If even one result to indicate "there is no cache" (S65: YES) is returned from the user terminal 12, the scene estimation unit 6 acquires the scene name list from the scene table TB 1 (S66), and transmits this to the user terminal 12 on an as-is basis (S67), and thereupon the scene estimation process S60 ends.

Next, the chunk estimation process S80 will be described. The chunk estimation process S80 is comprised of steps S81 to S88. The chunk estimation unit 7 receives the scene name selected by the user from the user terminal 12 (S81).

When the chunk estimation unit 7 receives the scene name from the user terminal 12, the chunk estimation unit 7 acquires a model ID from the model table TB 2 (S82). Next, the chunk estimation unit 7 designates one of a plurality of second trained model DBs 2 based on the model ID, and inputs the served-object image 40 (41 to 43) received from the image division unit 5, to the designated second trained model DB 2 (S83).

The chunk estimation unit 7 acquires a chunk-meta ID list as an output from the second trained model DB 2 (S84), and acquires the first chunk ID list from the chunk/meta table TB 6 (S85). Next, the chunk estimation unit 7 transmits the first chunk ID list to the user terminal 12 on an as-is basis, and inquires with the user terminal 12 about the availability of cache (S86).

When all results returned from the user terminal 12 indicate "there is a cache" (S86: NO), the scene estimation process S80 ends, and thereupon the chunk output process S100 is started. When even one result to indicate "there is no cache" (S86: YES) is returned from the user terminal 12, the chunk estimation unit 7 acquires a chunk summary list from the chunk table TB 7 (S87), and transmits this to the user terminal 12 on an as-is basis (S88), and thereupon the chunk estimation process S80 ends.

Next, the chunk output process S100 will be described. The chunk output process S100 is comprised of steps S101 to S103. The chunk output unit 8 receives the chunk summary selected by the user, from the user terminal 12 (S101).

When the chunk output unit 8 receives the chunk summary from the user terminal 12, the chunk output unit 8 acquires the chunk from the chunk table TB 7 (S102), and transmits this to the user terminal 12 on an as-is basis (S103), and thereupon the chunk output process S100 ends.

Figure 10:
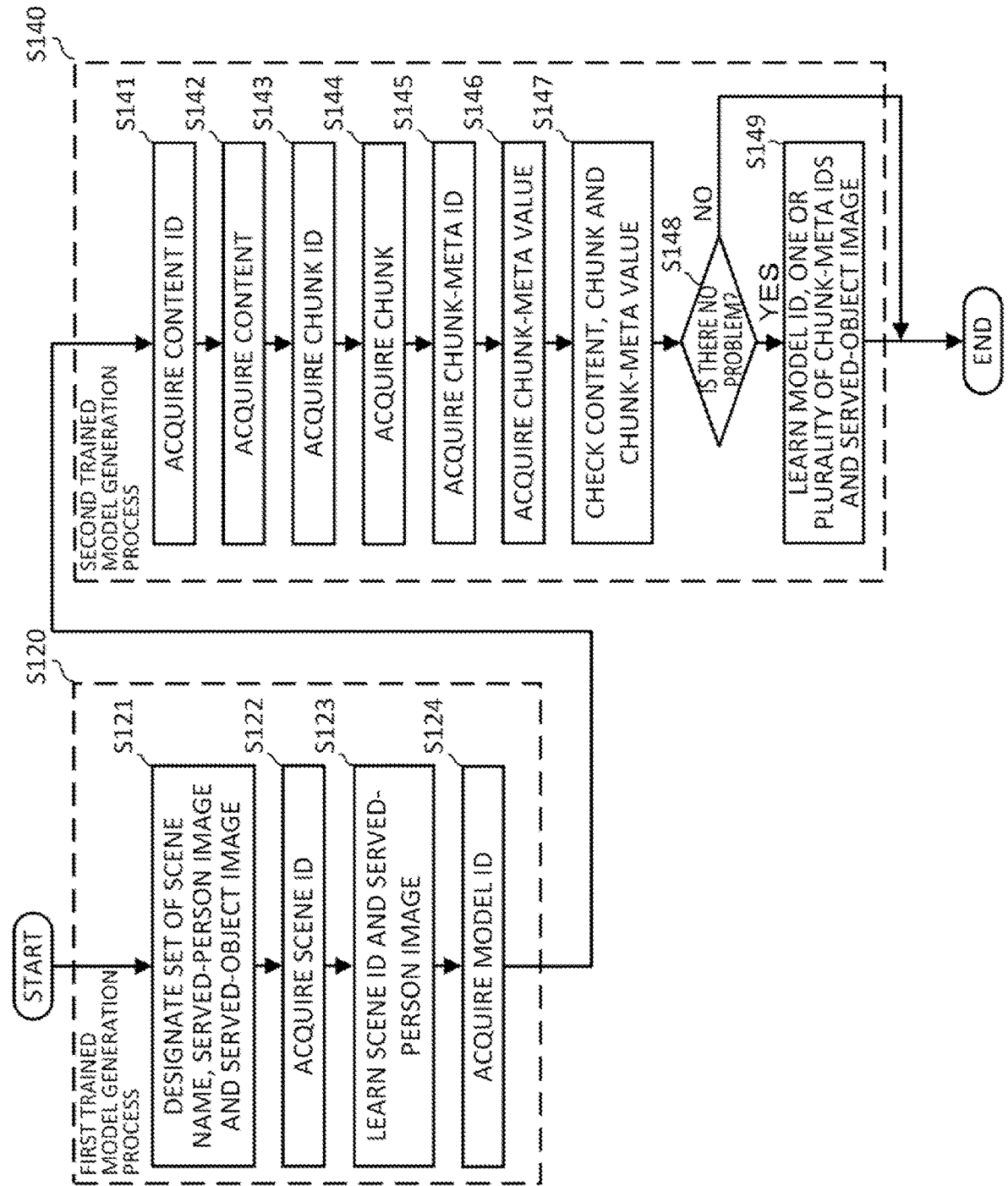
FIG. 10 is a flowchart to show the processing procedures of information processing in the training stage according to the present embodiment.

Next, the information processing in the training stage will be described with reference to FIG. 10. FIG. 10 is a flowchart to show the processing procedures of information processing in the training stage according to the present embodiment. The information processing in the training stage is comprised of a first trained model generation process S120 and a second trained model generation process S140.

First, the first trained model generation process S120 will be described. The first trained model generation process S120 is comprised of steps S121 to S124. The first trained model generation unit 9 designates a set of a scene name, a served-person image 30 (35) and one or a plurality of served-object images 40 (41 to 43), and then, using the scene name as a search key, searches the scene table TB 1 (S121).

The first trained model generation unit 9 acquires a scene ID from the scene table TB 1 as a result of the search (S122), and has the scene ID and the served-person image 30 (35) learned in the first training model DB 1', as a set (S123).

Next, the first trained model generation unit 9 requests the acquisition of a model ID, by transmitting the scene ID acquired in step S122 to the model table TB 2, and acquires the model ID (S124).

Next, the second trained model generation process S140 will be described. The second trained model generation process S140 is comprised of steps S141 to S150. Using the scene ID acquired in step S122 as a search key, the second trained model generation unit 10 searches the scene/content table TB 4, and acquires a content ID (S141).

Using the acquired content ID as a search key, the second trained model generation unit 10 searches the content table TB 3, and acquires contents (S142). Furthermore, using the acquired content ID as a search key, the second trained model generation unit 10 searches the content/chunk table TB 5, and acquires a chunk ID (S143).

Furthermore, using the acquired chunk ID as a search key, the second trained model generation unit 10 searches the chunk table TB 7, and acquires a chunk (S144). Furthermore, using the acquired chunk ID as a search key, the second trained model generation unit 10 searches the chunk/meta table TB 6, and acquires one or a plurality of chunk-meta IDs (S145).

Furthermore, using each of the one or a plurality of chunk-meta IDs acquired, as a search key, the second trained model generation unit 10 searches the chunk-meta table TB 8, and acquires chunk-meta values that each correspond to a chunk-meta ID (S146).

The second trained model generation unit 10 checks whether there are no problems with the contents acquired in step S142, the chunk acquired in step S144, and the chunk-meta values acquired in step S146, with reference to the served-object image 30 (35) and the served-person image 40 (41 to 43) (S147).

If there is a problem as a result of the checking (S148: NO), the information processing in the training stage for the set being processed ends. If there is no problem as a result of the checking (S148: YES), the second trained model generation unit 10 has the model ID, one or a plurality of chunk-meta IDs, and the served-object image 40 (41 to 43) learned in the second training model DB 2' as a set (S149), and thereupon the information processing in the training stage for the set being processed ends.

As described above, by means of the information processing device 1 according to the present embodiment, chunks that divide or suggest work information are presented via the user terminal 12. Consequently, it is possible to present the required amount of information by setting chunks in an appropriate manner. Also, if a chunk serves as information to suggest the whole of a document, there is no need to reconstruct information on a large scale.

By using the model table TB 2, it is possible to cope with cases where the relationship between the first trained model DB 1 and the second trained model DB 2 changes, by changing the model table TB 2 alone, so that it is possible to provide a device having excellent maintainability.

Note that, when the model table TB 2 is not used and the relationship between the first trained model DB 1 and the second trained model DB 2 changes, the trained model DB 2 needs to be re-generated.

Although, with the present embodiment, the image acquisition unit 4, the image division unit 5, the scene estimation unit 6, the chunk estimation unit 7, the chunk output unit 8, the first trained model generation unit 9, the second trained model generation unit 10 and the recommended image output unit 13 are programs, this is by no means limiting, and they may be logic circuits as well.

Furthermore, the image acquisition unit 4, the image division unit 5, the scene estimation unit 6, the chunk estimation unit 7, the chunk output unit 8, the first trained model generation unit 9, the second trained model generation unit 10, the first trained model DB 1, the first training model DB 1', the second trained model DB 2, the second training model DB 2', the scene table TB 1, the model table TB 2, the content table TB 3, the scene/content table TB 4, the content/chunk table TB 5, the chunk/meta table TB 6, the chunk table TB 7, the chunk-meta table TB 8 and the recommendation table TB 9 may not be mounted on one device, and may be mounted on a plurality of devices connected by a network in a distributed manner.

Figure 8:
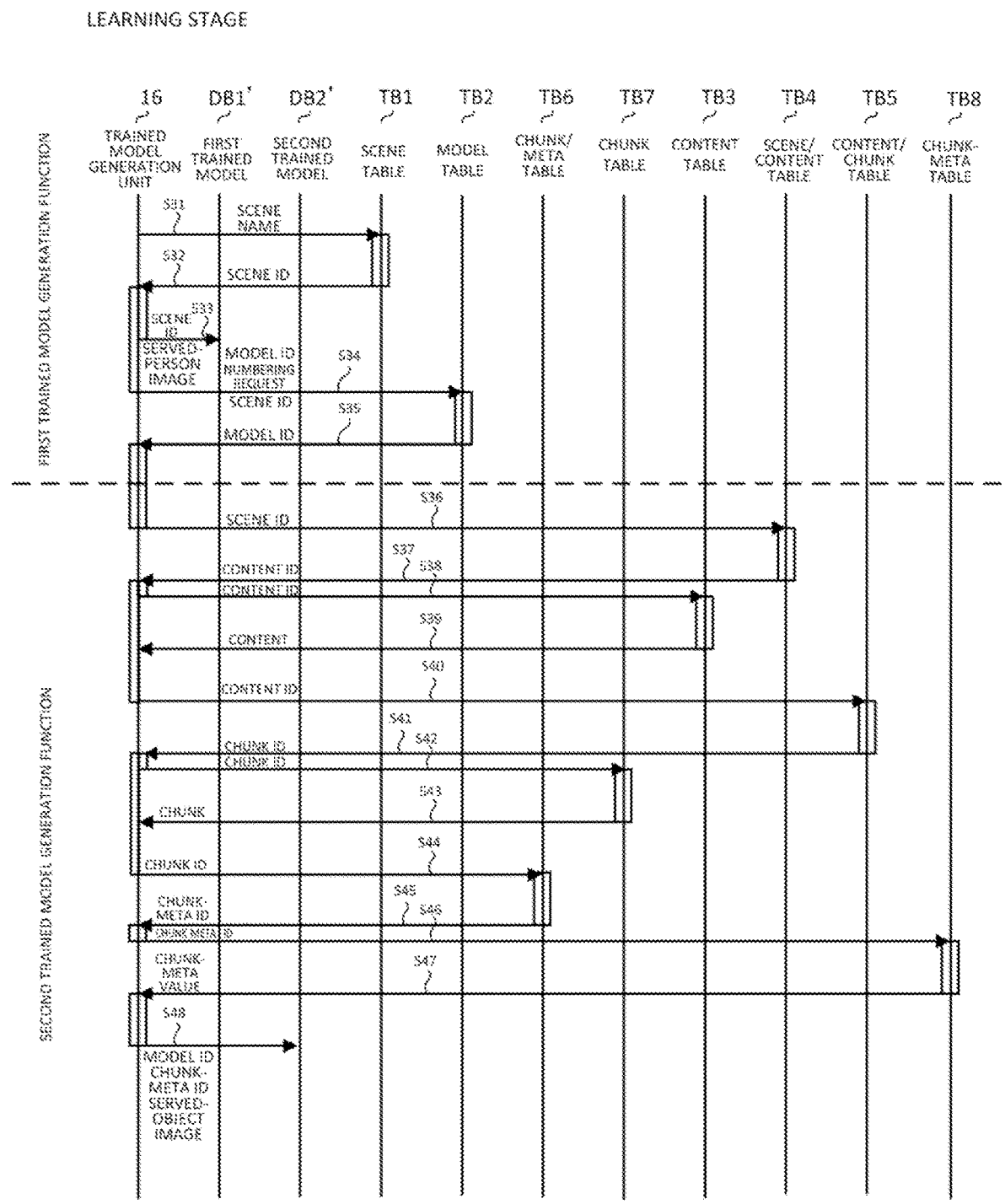
FIG. 8 is a sequence diagram for use for describing the first trained model generation function and the second trained model generation function according to the present embodiment.

Also, although cases have been described with relationship to the training stage illustrated in FIG. 8 and FIG. 10 described above where the first trained model and the second trained model are generated associated with each other, the present invention is by no means limited to this, and the first trained model DB 1 and the second trained model DB 2 may be generated separately.

When the first trained model DB 1 and the second trained model DB 2 are generated separately, and, for example, the scene is an existing one and the contents alone are to be added, no learning needs to be carried out for the scene.

Although cases have been described with the present embodiment where a plurality of second trained model DBs 2 are used, this is by no means limiting, and one second trained model DB 2 may be used as well. Furthermore, although cases have been described with the present embodiment where images of served objects that are deemed to be basically necessary are displayed, this is by no means limiting, and it is equally possible to display part of served objects that are deemed to be basically necessary. Also, the present embodiment may as well suggest served subjects that are deemed to be basically unnecessary, or part of such served objects.

The information processing device 1 of the present embodiment may be designed so that, a tree structure that is associated by means of an image division unit and a layered structure that is comprised of values output from the first trained model DB 1 and the second trained model DB 2 may be compared, in the use stage, to identify parts that are excessive or short.

REFERENCE SIGNS LIST

1: information processing device
2: central processing device
3: main storage device
4: image acquisition unit
5: image division unit
6: scene estimation unit
7: chunk estimation unit
8: chunk output unit
9: first trained model generation unit
10: second trained model generation unit
11: auxiliary storage device
12: user terminal
13: recommended image output unit

The invention claimed is:

1. An information processing device to output work information, which is information related to work performed by a serving person, the information processing device comprising:
   an image acquisition unit to acquire an original image, which is an image including a served person that the serving person serves, and a plurality of served objects that the serving person serves;
   an image division unit to divide the original image into a served-person image, in which the served person is captured, and a plurality of served-object images, in which each served object is captured;
   a scene estimation unit to estimate a scene, which is a situation the serving person is in, by using a first trained model, in which an association between the served-person image and a scene ID to uniquely indicate the scene is stored;
   a chunk estimation unit to estimate a chunk, which is information dividing or suggesting the work information, by using one of a plurality of second trained models, in which an association between the plurality of served-object images and one or a plurality of chunk meta IDs, associated on a one-to-one basis with a chunk ID to uniquely indicate the chunk is stored; and
   an output unit to output the chunk,
   wherein the chunk estimation unit selects one of the plurality of second trained models by using a model ID associated with a scene ID on a one-to-one basis, and
   wherein the chunk metal IDs uniquely indicate meta values, which are information related to a nature of the served objects.

2. The information processing device according to claim 1, further comprising a recommended image output unit,
   wherein the recommended image output unit,
using a combination of a model ID and the one or the plurality of chunk meta ID as a search key, searches a recommended served-object image, and
   wherein the recommended served-object image is an image of a served object that is not captured in the original image but is deemed to be basically necessary.

3. The information processing device according to claim 1, wherein the image division unit makes the served person a root node and the plurality of served objects leaf nodes or internal nodes, and associates between the served person and the plurality of served objects.

4. The information processing device according to claim 3, wherein the image division unit further acquires information included in at least one of the served objects and associates the information as a leaf node with the tree structure.

5. An information processing method that an information processing device to output work information performs, which is information related to work performed by a serving person, the information processing method comprising:
   a first step of acquiring an original image, which is an image including a served person that the serving person serves, and a plurality of served objects that the serving person serves;
   a second step of dividing the original image into a served-person image, in which the served person is captured, and a plurality of served-object images, in which each served object is captured;
   a third step of estimating a scene, which is a situation the serving person is in, by using a first trained model, in which an association between the served-person image and a scene ID to uniquely indicate the scene is stored;
   a fourth step of estimating a chunk, which is information dividing or suggesting the work information, by using one of a plurality of second trained models, in which an association between the plurality of served-object images and one or a plurality of chunk meta IDs, associated on a one-to-one basis with a chunk ID to uniquely indicate the chunk is stored; and
   a fifth step outputting the chunk,
   wherein one of the plurality of second trained models is selected by using a model ID associated with a scene ID on a one-to-one basis, and
   wherein the chunk metal IDs uniquely indicate meta values, which are information related to a nature of the served objects.

* * * * *